(12) United States Patent
Matsui

(10) Patent No.: US 6,549,231 B1
(45) Date of Patent: Apr. 15, 2003

(54) IMAGE RECORDING APPARATUS

(75) Inventor: Seiichi Matsui, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/198,247

(22) Filed: Nov. 24, 1998

(30) Foreign Application Priority Data

Nov. 27, 1997 (JP) .............................. 9-325664

(51) Int. Cl.[7] .............................. H04N 7/18; H04N 9/47
(52) U.S. Cl. .......................... 348/61; 348/63; 348/151; 348/211; 348/212
(58) Field of Search .............................. 348/61, 63, 151, 348/373–376, 211, 212, 214; 382/114; 345/327, 156; 350/298

(56) References Cited

U.S. PATENT DOCUMENTS

| | | | | |
|---|---|---|---|---|
| 4,026,641 A | * | 5/1977 | Bosserman | 350/298 |
| 4,516,157 A | * | 5/1985 | Campbell | 358/108 |
| 5,610,678 A | * | 3/1997 | Tsuboi et al. | 396/373 |
| 5,777,715 A | * | 7/1998 | Kruegle | 351/158 |
| 5,844,824 A | * | 12/1998 | Newman et al. | 364/708 |

* cited by examiner

Primary Examiner—Chris Kelley
Assistant Examiner—Charles E. Parsons
(74) Attorney, Agent, or Firm—Birch, Stewart, Kolasch & Birch, LLP (57) ABSTRACT

An imaging part and sensors are provided on an eyeglasses-shaped frame, which connects to a body through a cable. When a cameraman wears the frame just like eyeglasses, a taking lens is directed in the same direction that the face of the cameraman faces, so that a subject to be captured can be in the same direction as a line of sight of the cameraman. The sensors generate detection signals upon detecting movement of muscles at the temples of the cameraman by detecting myoelectric impulses. The image recording apparatus is controlled in accordance with the detection signals, which represent an arrangement of the movement for control. For example, when the cameraman closes the right eye to move the muscles at the right temple, the subject is zoomed in, and when the cameraman closes both eyes, the captured image is recorded.

11 Claims, 5 Drawing Sheets

IMAGE RECORDING APPARATUS

BACKGROUND OF THE INVENTION

1. Field of the Invention

The present invention relates generally to an image recording apparatus, and more particularly to an image recording apparatus such as a video camera and a digital still camera that records captured images in a recording medium such as video tape and a memory.

2. Description of Related Art

An image recording apparatus such as a video camera and a digital camera, which captures and records images of a subject, is well known. To take a picture using the conventional digital still camera, a cameraman holds the camera in one hand or both hands, aims the camera at the subject, determines the composition of the image to be recorded through a finder, and presses a record switch with his finger to record the image of the subject. Although the conventional video camera is different from the digital still camera in that the cameraman continuously presses the record switch with his finger during the image-recording, they are similar in that the cameraman holds the camera and operates the camera with his hands and fingers.

In the conventional camera, the cameraman must hold the camera, and his line of sight is directed to the finder of the camera. It is therefore difficult for the cameraman to do any other thing during the image-recording. Moreover, the cameraman has to turn the camera to the subject to capture the image of the subject, and thus, he may miss a good opportunity for the image-recording due to a delay in the turning actions.

As stated above, the conventional image recording apparatus has a problem in that the cameraman has to perform a sequence of complicated operations for recording the image.

SUMMARY OF THE INVENTION

The present invention has been developed in view of the above-described circumstances, and has as its object the provision of an image recording apparatus which solves a problem of complicated image-recording operations, and makes it possible for a cameraman to do other things during the image-recording without missing a good opportunity for the image-recording.

To achieve the above-mentioned object, the present invention is directed to an image recording apparatus comprising: an imaging part provided with a taking lens and an imaging device, the imaging device photoelectrically converting an image of a subject formed through the taking lens into an image signal; a detecting device for generating a detection signal upon detecting one of voice of a cameraman and movement of a predetermined part other than hands of a body of the cameraman; a fixing device for detachably fixing the imaging part and the detecting device to the body of the cameraman such that the taking lens is directed in the same direction that a face of the cameraman faces; and a body for recording the image signal in a recording part in accordance with the detection signal sent from the detecting device.

According to the present invention, the imaging part and the detecting device are fixed to the body of the cameraman with the fixing device in such a way that the taking lens is directed in the same direction that the face of the cameraman faces. The detecting device generates the detection signal upon detecting the voice of the cameraman, or the movement of the predetermined part other than the hands of the body of the cameraman. Then, the image-recording is controlled in accordance with the detection signal. The intention of the cameraman such as the intention to record the captured image is thus determined. The cameraman hence has not to hold the image recording apparatus, and has not to operate the apparatus with his fingers.

Consequently, the cameraman can take a picture without using his hands. Since the imaging part is always directed in the same direction that the face of the cameraman faces, there is no necessity for the cameraman to specially turn the taking lens to the subject, thus preventing the cameraman from missing a good opportunity of the image-recording.

Moreover, the zoom lens is employed as the taking lens, and the zoom lens is provided with the electric drive mechanism for driving the zoom lens in the telephoto and wide directions. The electric drive mechanism is controlled by the zoom controller in accordance with the detection signal sent from the above-described detecting device or an additional detecting device similar to the above-described detecting device. Therefore, the cameraman can perform the zooming operation without using his hands.

The imaging part preferably captures images from substantially the same height as the eye of the cameraman. The fixing device is preferably shaped like glasses, goggles, a cap, or a headset to be attached to the head of the cameraman in such a way that the imaging part can be placed substantially at the height of the eye of the cameraman.

The image recording apparatus of the present invention further comprises an image display apparatus, the image display apparatus being arranged over the eye of the cameraman when the fixing device is worn on the head of the cameraman, the image display apparatus comprising: an image display for displaying an image represented by the image signal sent from the imaging part; and an optical system for forming an optical path to transmit a light from the image display to the eye of the cameraman so as to enable the cameraman to look at the image displayed on the image display. Accordingly, the cameraman can easily confirm the captured image.

The image recording apparatus of the present invention further comprises an image display apparatus, the image display apparatus being arranged over the eye of the cameraman when the fixing device is worn on the head of the cameraman, the image display apparatus comprising: a first optical system for forming a first optical path to transmit a light from the subject to the eye of the cameraman so as to enable the cameraman to look at the subject directly; an image display for displaying an image represented by the image signal sent from the imaging part, the image display being arranged outside the first optical path; and a second optical system for forming a second optical path to transmit a light from the image display to the eye of the cameraman so as to enable the cameraman to look at the image displayed on the image display. Accordingly, the cameraman can look at the subject directly and confirm the captured image. The image display apparatus may include an optical path selecting device for selecting one of the first optical system and the second optical system to be activated; and an optical path switching device for selectively activating the selected one of the first optical system and the second optical system. The image display apparatus may include a semitransparent mirror provided on the first optical path so as to enable the cameraman to look at the subject directly and look at the image displayed on the image display at the same time.

Furthermore, the image display apparatus may include a light quantity adjusting device for adjusting quantity of light transmitted through the first optical path, the light quantity adjusting device being arranged on a subject's side of the semitransparent mirror on the first optical path. It is therefore possible to adjust a rate for mixing the light from the image display (the captured image) and the light from the subject (the directly-observed image).

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
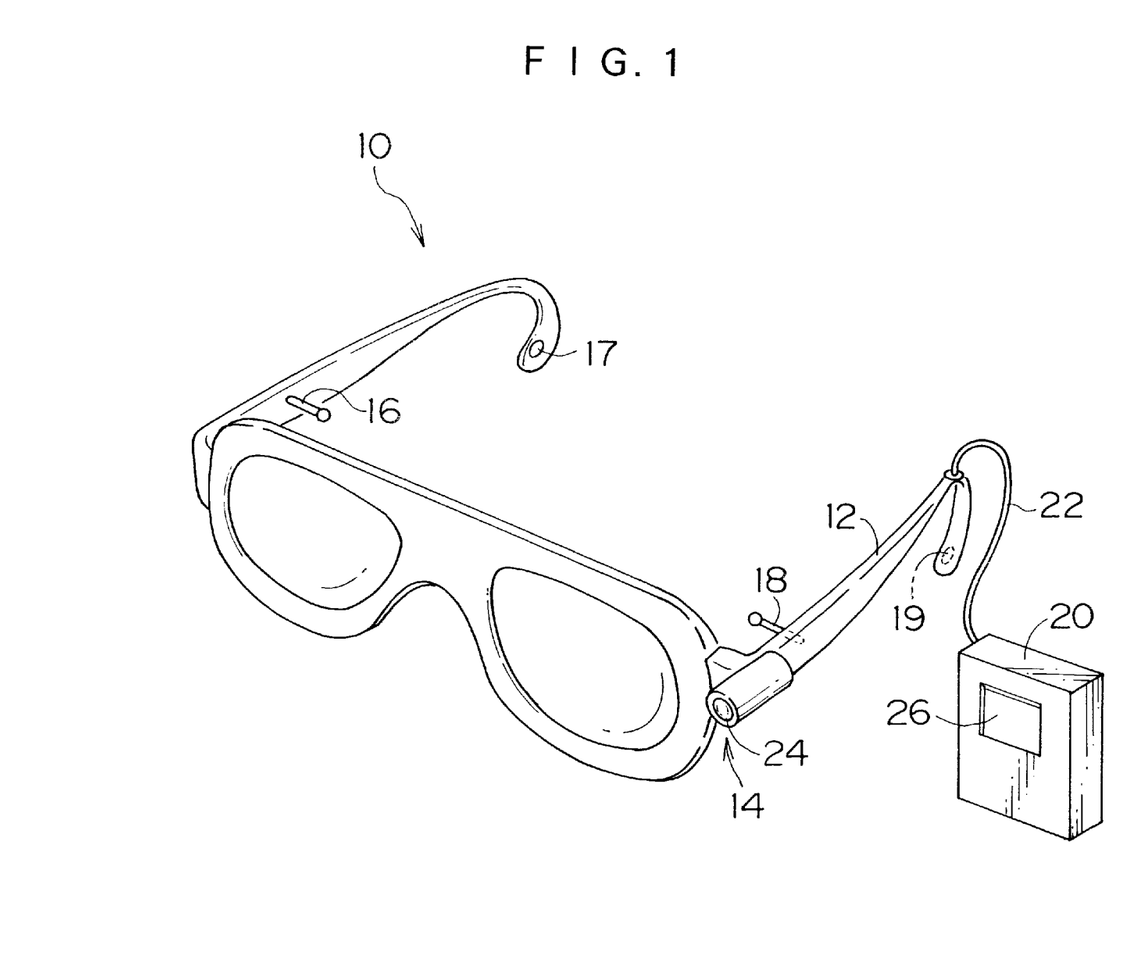
FIG. 1 is a perspective view illustrating the appearance of an image recording apparatus according to the first embodiment of the present invention.

FIG. 1 is a view illustrating the appearance of an image recording apparatus according to the first embodiment of the present invention. The image recording apparatus 10 is a digital still camera, which records still pictures electronically. An imaging part 14 and a detecting device or sensors 16, 17, 18 & 19 are attached on a fixing device or an eyeglasses-shaped frame 12, which connects to a body 20 through a cable 22. An embodiment of the frame is not restricted to FIG. 1, and it may be shaped like a mask, cap, hat, helmet, goggles, etc.

The imaging part 14 includes a taking lens 24 and an imaging device or a charge coupled device (CCD) (not illustrated in FIG. 1), which is arranged behind the taking lens 24. Although the structure of the taking lens 24 is not illustrated, a rear focus type zoom lens, which comprises a variable focal-length lens group and a compensator lens group, is used, and an electric drive mechanism including a motor drives the zoom lens in the telephoto and wide directions. A fixed focal-length lens may be used as the taking lens 24 in stead of the zoom lens.

The imaging part 14 is attached to the right side of the frame 12 through an angle-adjustable joint (not illustrated) in such a way that an optical axis of the taking lens 24 is directed forward when the frame 12 is worn on the head of a cameraman. The imaging part 14 is not necessarily attached to the right side of the frame 12. The imaging part 14 may also be attached to the left side of the frame 12 and the central part at the front of the frame 12 if the taking lens 24 is directed in the same direction that the face of the cameraman faces when the frame 12 is worn on the head of the cameraman.

The sensors 16, 17, 18 & 19 detect movement of muscles at the temples of the cameraman, who wears the frame 12. The sensors 16 and 18 are first electrodes to be in contact with the temples of the cameraman, and the sensors 17 and 19 are second electrodes to be in contact with the parts behind the ears of the cameraman. In this embodiment, the sensors detect the muscle movement by detecting myoelectric impulses, or by detecting minute differences in electric potential between the sensors, as is the case with a well-known electrocardiograph. The sensors, however, are not restricted to these, and they may be mechanical movement sensors or non-contact movement sensors, which detect movement of the skin at the temples of the cameraman.

The imaging part 14 and the sensors 16, 17, 18 & 19 connect electrically to the body 20 through wiring provided inside the frame 12 and the cable 22.

Although the structure of the body 20 will be described later in further detail, the body 20 has an image display 26 such as a liquid crystal display (LCD). Images captured by the imaging part 14 are displayed on the image display 26.

Although not illustrated, a light emitting diode (LED), etc. is provided at the edge of the frame 12, so that the cameraman can confirm a variety of information such as the residual amount of a battery and the number of recorded images in accordance with the state of the LED.

Figure 2:
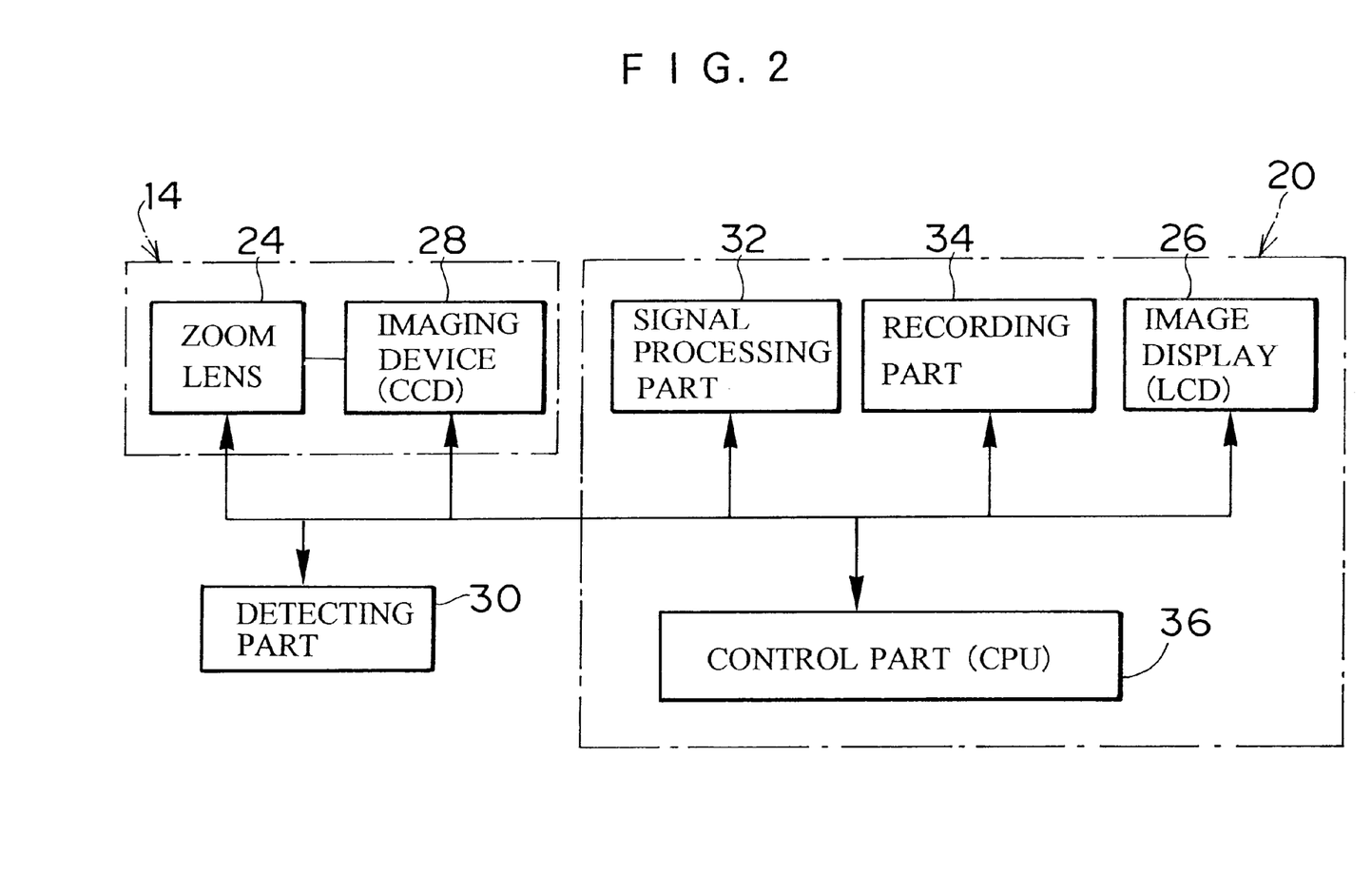
FIG. 2 is a block diagram illustrating the structure of the image recording apparatus in FIG. 1.

FIG. 2 is a block diagram illustrating the structure of the image recording apparatus 10. The image recording apparatus 10 comprises the taking lens 24, the CCD 28, the detecting device or a detecting part 30, which includes the sensors 16, 17, 18 & 19 in FIG. 1, a signal processing part 32, a recording part 34, the image display 26, and a control part or a central processing unit (CPU) 36. The signal processing part 32, the recording part 34, the image display 26 and the control part 36 are provided in the body 20.

An image of the subject is formed on a light receiving surface of the CCD 28 through the taking lens 24, and the CCD 28 photoelectrically converts the image into an image signal, which is read sequentially. Although not illustrated in detail, the signal processing part 32 includes a signal processor that comprises an analog processing circuit such as a CDS cramp circuit and a gain adjustment circuit, an A/D converter, a digital image processing circuit such as a luminance signal producing circuit, a color difference signal producing circuit and a gamma correction circuit, and so forth.

The image signal sent from the CCD 28 is processed in the signal processing part 32, and it is recorded in the recording part 34 such as a built-in memory (e.g., a flash memory built in the body 20) and a detachable external memory card based on a predetermined format such as an exchangeable image file format (Exif).

The image signal read from the CCD 28 or the recording part 34 is processed in the signal processing part 32, and the processed image signal is sent to the image display 26 so that the captured image can be shown on the image to display 26. The image display 26 shows not only still recorded images but also moving images and/or intermittently moving images captured before the recording.

The image recording apparatus 10 has a well-known automatic exposure adjustment (AE) function and an autofocus (AF) function. Only directing the taking lens 24 toward the subject enables the optimum exposure and focus adjustments to be performed automatically.

The control part 36 supervises the circuits in the image recording apparatus 10, and determines intention of the cameraman in accordance with detection signals sent from the detecting part 30. The control part 36 also controls the imaging part 14 to zoom and focus so as to capture images, controls the display on the image display 26, and controls the reading/writing of the data in the recording part 34.

A description will be given of the operation of the image recording apparatus, which is constructed in the above-mentioned manner.

When the cameraman wears the frame 12 on his head in such a way that the frame 12 is supported by his ears and nose, the taking lens 24 is directed in the same direction that the face of the cameraman faces. When the power of the body 20 is turned on, the image captured by the imaging part 14 is displayed on the image display 26 so that the cameraman can confirm the direction of the taking lens 24. While looking at the captured image on the image display 26, the cameraman finely adjusts the direction of the taking lens 24 so that the direction of the taking lens 24 can correspond substantially to the cameraman's line of sight.

The sensors 16, 17, 18 & 19 (the detecting part 30) detect the muscle movement at the temples of the cameraman in order to determine the intention of the cameraman such as an intention to zoom in on the subject or record the captured image. That is because the muscles at the temples hardly move when a person involuntarily blinks, but they move when the person voluntarily closes the eye or winks.

For example, the following rule is predetermined. When the cameraman closes the right eye to move the muscles at the right temple, the taking lens 24 is moved in the telephoto direction (zoom-in). When the cameraman closes the left eye to move the muscles at the left temple, the taking lens 24 is moved in the wide direction (zoom-out). When the cameraman closes both eyes to move the muscles at the right and left temples, the image-recording is performed. The detection signals sent from the detecting part 30 (the sensors 16, 17, 18 & 19) are defined with respect to such control types.

In accordance with the predetermined rule, the cameraman operates the image recording apparatus 10 by moving the temples without using his hands.

In this embodiment, the frame 12 connects to the body 20 through the cable 22, but the present invention is not restricted to this. The signals may be transmitted between the frame 12 and the body 20 in wireless communication using electromagnetic waves. If the size of the body 20 is reduced, it is possible to integrate the functions of the body 20 with the imaging part 14 or the frame 12.

In this embodiment, the image recording apparatus 10 determines the intention of the cameraman by detecting the movement of his temples, but the present invention is not restricted to this. It is also possible to determine the intention of the cameraman by detecting movement of any part of his body excluding his hands. It is particularly preferable to detect the movement of a part in or around the face of the cameraman.

A description will be given of the second embodiment of the present invention.

Figure 3:
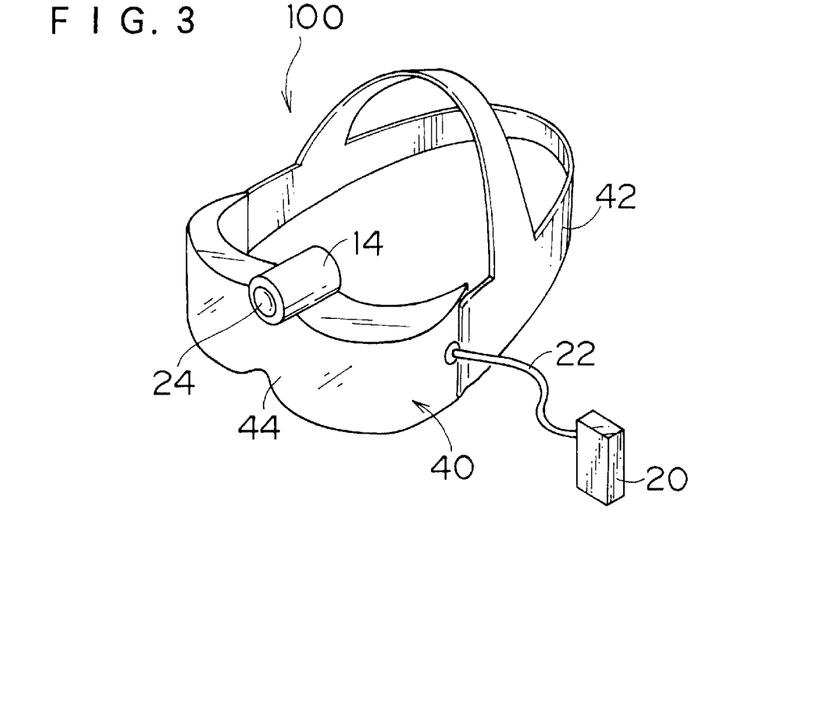
FIG. 3 is a perspective view illustrating the appearance of an image recording apparatus according to the second embodiment of the present invention.

FIG. 3 shows an image recording apparatus 100 of the second embodiment in which the present invention is applied to a goggles-shaped personal LCD projector. The image recording apparatus 100 comprises the imaging part 14, an image display apparatus or an LCD projector 40, and the fixing device or a fixer 42, which is used to fix the LCD projector 40 on the head of the cameraman. When the cameraman wears the fixer 42 on his head, the LCD projector 40 is arranged over the eyes of the cameraman. An embodiment of the fixer is not restricted to FIG. 3, and it may be shaped like a mask, cap, hat, helmet, glasses, etc.

The imaging part 14 is attached to the central part at the top of the LCD projector 40 through an angle-adjustable joint (not illustrated) in such a way that the optical axis of the taking lens 24 is directed forward. The imaging part 14 and the LCD projector 40 connect to the body 20 through the cable 22. Although the image recording apparatus 100 is different from the image recording apparatus 10 in FIG. 1 in the appearance, the inner structure of the image recording apparatus 100 is substantially the same as the one described in FIG. 2, and a detailed description thereof will be omitted.

At least front and back parts of a casing 44 for the LCD projector 40 are made of a transparent material, and the cameraman can directly look at the exterior while he wears the LCD projector 40.

Figure 4:
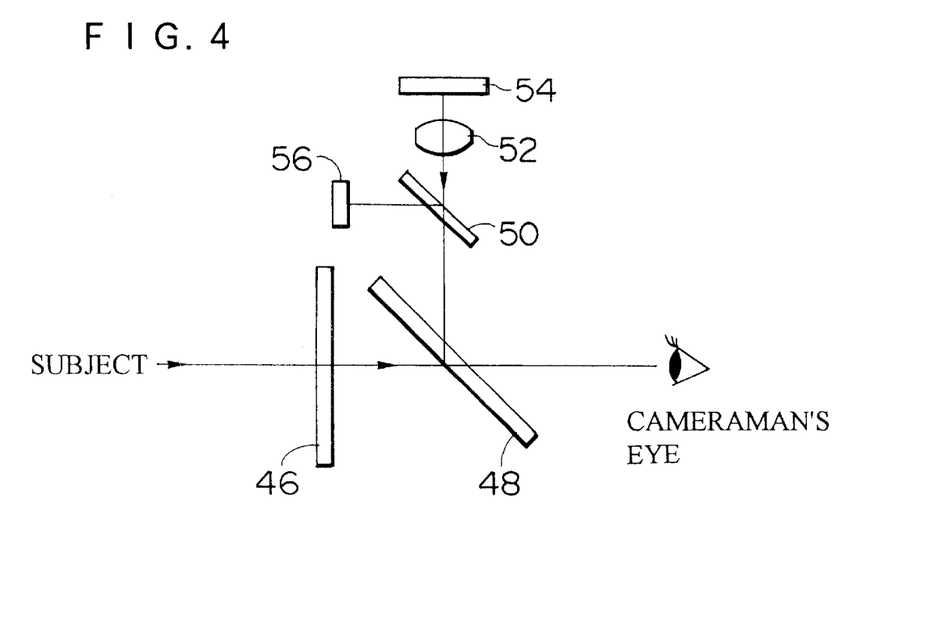
FIG. 4 is a view illustrating the inner structure of an LCD projector in FIG. 3.

FIG. 4 shows the inner structure of the LCD projector 40. A light quantity adjusting device or a liquid crystal aperture 46 and a first semitransparent mirror 48 are arranged in the casing 44 of the LCD projector 40. A second semitransparent mirror 50, a lens 52, and an image display or an LCD 54 are arranged above the first semitransparent mirror 48. The detecting device or a blink sensor 56 detecting a blink of the cameraman is arranged at the left side of the second semi-transparent mirror 50.

Figure 5:
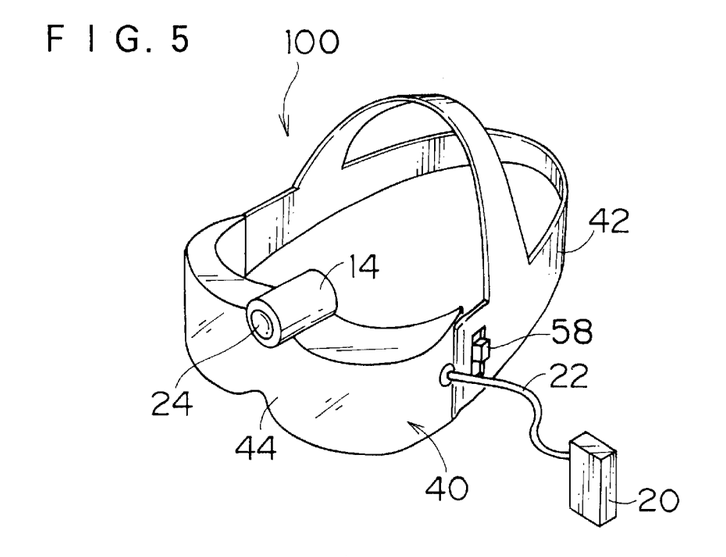
FIG. 5 is a perspective view illustrating the appearance of a modified example of the image recording apparatus in FIG. 3.

A light from the subject (the subject's light) is transmitted directly (i.e., pure-optically) to the eye of the cameraman through the first optical path formed by the first optical system or the liquid crystal aperture 46 and the semitrans-parent mirror 48. The liquid crystal aperture 46 is capable of changing transparency thereof to control the quantity of light transmitted through it in accordance with an applied voltage. When a control knob (not illustrated) provided on the body 20 is operated, the voltage applied to the liquid crystal aperture 46 is changed according to the operation, and the quantity of light that enters directly from the subject is adjusted. A control knob 58 shown in FIG. 5 may be proved instead of the control part of the body 20.

The LCD 54 displays the image captured by the imaging part 14, and the LCD 54 is arranged in the upper section (or lower section) of the casing 44 in such a way as not to block the visual field of the cameraman who is directly looking at the subject through the first optical path.

The lens 52 and the second semitransparent mirror 50 are arranged in front of the LCD 54. The lens 52 magnifies the image displayed on the LCD 54. A light emitted from the LCD 54 (a displayed image light) is transmitted to the eye of the cameraman through the second optical path formed by the second optical system or the lens 52, the second semi-transparent mirror 50 and the first semitransparent mirror 48. The subject's light and the displayed image light are added on the first semitransparent mirror 48, and are transmitted to the eye of the cameraman simultaneously. That is, the image displayed on the LCD 54 is superimposed on the direct (pure-optical) image of the subject.

Consequently, the cameraman can look at the subject directly and confirm the image captured by the imaging part 14 in the same visual field at the same time.

The image recording apparatus 100 employs the blink sensor 56 that optically detects movement of the eyelid of the cameraman in order to determine the intention of the cameraman. Specifically, the blink sensor 56 in FIG. 4 detects whether the cameraman opens or closes his eye, taking into consideration the fact that a reflection rate of the eyeball is different from that of the eyelid. A light reflected on the eyeball or the eyelid of the cameraman is transmitted to the blink sensor 56 through the first semitransparent mirror 48 and the second semitransparent mirror 50. Whether the cameraman opens or closes his eye is determined in accordance with the quantity of the reflected light.

The detection signal is sent from the blink sensor 56 to the control part 36 of the body 20. The control part 36 performs a variety of controls in accordance with the detection signal. Specifically, what kind of control such as zoom-in, zoom-out, recording, etc. should be performed is predetermined in accordance with a time in which the eyelid is closed, combinations of the states of both eyelids, the number of blinks, or the like in order to distinguish the voluntary blinks from the involuntary blinks.

The LCD 54 may also display a variety of information such as the residual amount of a battery and the number of recorded images, which is transmitted from the body 20, so that the cameraman can confirm the state of the apparatus.

According to the image recording apparatus 100, which is constructed in the above-mentioned manner, the cameraman can operate the image recording apparatus 100 by voluntarily blinking in accordance with the predetermined arrangement. The cameraman can confirm the image captured by the imaging part 14 and displayed on the LCD projector 40, and can directly look at the subject through the LCD projector 40.

In particular, the liquid crystal aperture 46 adjusts the quantity of the transmitted subject's light, thereby switching the image transmitted to the eye of the cameraman between the direct (pure-optical) image of the subject and the image captured by the imaging part 14, and freely setting a mixing rate of them. Moreover, an optical path switching device or a transparency-adjustable semitransparent mirror that can adjust its transparency may be employed as the first semitransparent mirror 48, so that the liquid crystal aperture 46 can be omitted. The transparency of the liquid crystal aperture 46 or the transparency-adjustable semitransparent mirror may be adjusted in accordance with the blinking of the cameraman, the operation of the control knob on the body 20, or the control knob 58 shown in FIG. 5.

Consequently, the cameraman can easily understand the state of the circumference during the image-recording and quickly confirm the recorded image.

Figure 6:
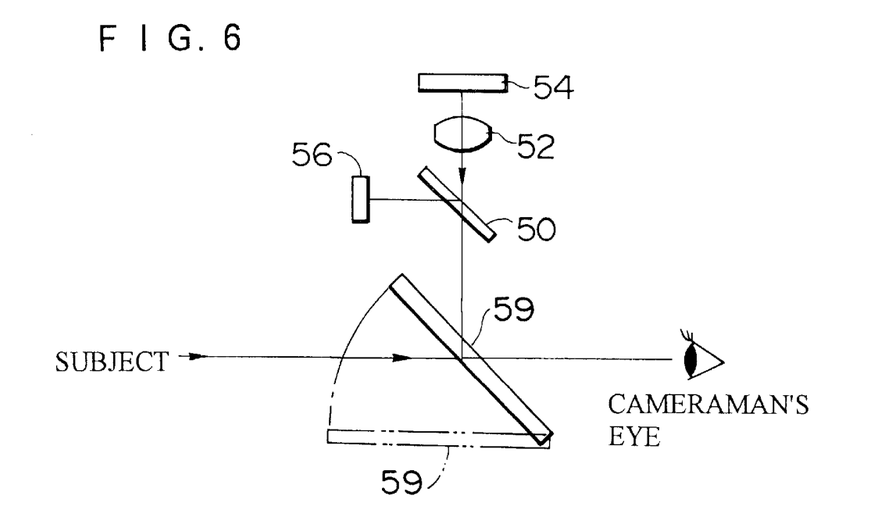
FIG. 6 is a view illustrating the inner structure of an LCD projector in FIG. 5.

In this embodiment, the subject's light and the displayed image light are added on the first semitransparent mirror 48, but the present invention is not limited to this. In FIG. 6, instead of the first semitransparent mirror 48, the optical path switching device or a movable mirror (without semitransparentness) 59 is provided. The movable mirror 59 is operatively connected with the optical path selecting device or the control knob 58 shown in FIG. 5, and is moved mechanically by force of the movement of the knob 58, but the present invention is not limited to this. The movable mirror 59 may be moved by a motor under control of the control part 36 in accordance with the movement of the knob 58, or the blinking of the cameraman (in this case, the knob 58 is omitted). The movable mirror 59 selectively activates the first and second optical system so as to switch the image transmitted to the eye of the cameraman between the direct (pure-optical) image of the subject and the image captured by the imaging part 14.

In this embodiment, the imaging part 14 and the LCD projector 40 connect to the body 20 through the cable 22, but the present invention is not restricted to this. The signals may be transmitted in wireless communication using electromagnetic waves. If the size of the body 20 is reduced, it is possible to integrate the functions of the body 20 with the imaging part 14 or the LCD projector 40.

In this embodiment, the image recording apparatus 100 may determine the intention of the cameraman by detecting the movement of any part of his body excluding the eyelids and the hands, as explained in the first embodiment.

A description will be given of the third embodiment of the present invention.

Figure 7:
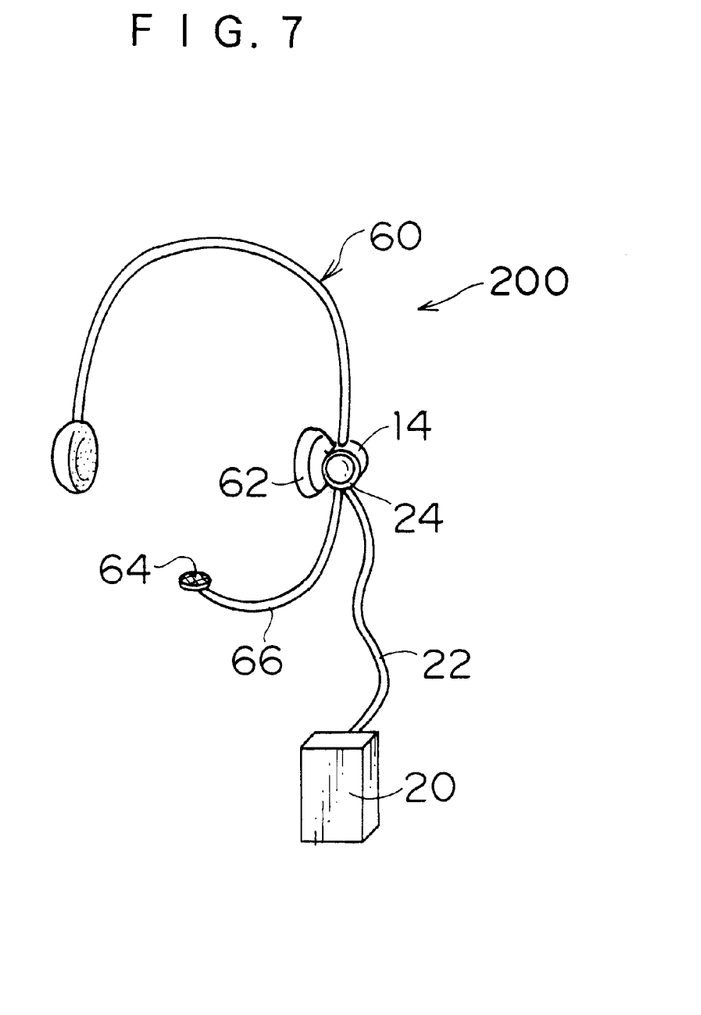
FIG. 7 is a perspective view illustrating an image recording apparatus according to the third embodiment of the present invention.

FIG. 7 shows an image recording apparatus 200 of the third embodiment in which the present invention is applied to a headset provided with a microphone for determining the intention of the cameraman through his voice. Although the image recording apparatus 200 is different from the image recording apparatus 10 in FIG. 1 in the appearance, the inner structure of the image recording apparatus 200 is substantially the same as the one described in FIG. 2, and a detailed description thereof will be omitted.

As shown in FIG. 7, the imaging part 14 is attached to the side of an earphone 62 of the fixing device or the headset 60 through an angle-adjustable joint (not illustrated) in such a way that the optical axis of the taking lens 24 is directed forward. The microphone 64 is provided at the end of a supporting member 66 extending from the part close to the earphone 62, so that the microphone 64 can be positioned close to the mouth of the cameraman when the headset 60 is worn on his head.

The headset 60 connects to the body 20 through the cable 22, and the image signal sent from the imaging part 14 and a sound signal sent from the microphone 64 are transmitted to the body 20 through the cable 22. A sound signal representing variety of information such as a residual amount of the battery is transmitted from the body 20 to the earphone 62 through the cable 22, so that the cameraman can recognize the state of the apparatus by the sound through the earphone 62.

The image recording apparatus in FIG. 7 employs the microphone 64 as the detecting device, which determines the intention of the cameraman. With the use of the well-known sound recognition techniques, it is possible to execute controls such as record, zoom-in, zoom-out, and the image-recording in accordance with instructions represented by the voice of the cameraman.

In this embodiment, the cameraman can perform the image-recording without using his hands, and the cameraman can directly look at the subject with his eyes. For this reason, the cameraman can easily understand the circumstance during the image-recording.

In this embodiment, the imaging part 14 and the headset 60 connect to the body 20 through the cable 22, but it is also possible to transmit the signals in wireless communication using electromagnetic waves.

Moreover, if the body 20 becomes smaller, the functions of the body 20 can be integrated with the imaging part 14 or the headset 60.

In the first, second and third embodiments, the description was given of the digital still camera, but the image recording apparatus of the present invention is not restricted to the camera that records still pictures. The present invention may also be applied to a video camera, which records moving pictures on a recording medium such as video tape, a built-in memory, a memory card, etc.

As set forth hereinabove, according to the image recording apparatus of the present invention, the imaging part is fixed on the body of the cameraman in such a way that the taking lens is directed in the same direction that the face of the cameraman faces. The intention of the cameraman is determined by detecting the voice of the cameraman or the movement of the body of the cameraman excluding the hands, and the image recording apparatus is controlled in accordance with the detection signals. Thus, the cameraman can perform the image-recording without using the hands. Since the taking lens is always directed in the same direction that the face of the cameraman faces, there is no necessity for the cameraman to specially turn the taking lens to the subject, thus preventing the cameraman from missing a good opportunity of the image-recording.

In particular, the image display apparatus is provided with the first optical system that transmits the light from the subject to the eye of the cameraman, and the second optical system that transmits the displayed image on the image display, which shows the image captured by the imaging part, to the eye of the cameraman. Accordingly, the cameraman can directly observe the subject and easily confirm the image captured by the imaging part. Thus, the cameraman can enjoy the atmosphere around the place without being bound by the image-recording operations.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording apparatus comprising:
   an imaging portion provided with a taking lens and an imaging device, the imaging device photoelectrically converting an image of a subject formed through the taking lens into an image signal, wherein the taking lens comprises a zoom lens provided with an electric drive mechanism driving the zoom lens in telephoto and wide directions;
   a detecting device for generating a detection signal upon detecting a movement of a predetermined part other than hands of a body of a cameraman, wherein said detecting device detects a muscle movement of the predetermined part other than hands of the body of the cameraman, and wherein said muscle movement is a movement of a temple of the cameraman or a blinking action of an eye of the cameraman;
   a fixing device for detachably fixing the imaging portion and the detecting device to the body of the cameraman such that the taking lens is directed in the same direction that a face of the cameraman faces;
   a body for recording the image signal in a recording portion in accordance with the detection signal sent from the detecting device; and
   a zoom controller for controlling the electric drive mechanism in accordance with the detection signal sent from the detecting device.

2. The image recording apparatus as defined in claim 1, wherein the image recording apparatus further comprises a second detecting device for generating a second detection signal upon detecting a movement of a predetermined part other than hands of the body of a cameraman; said zoom controller controlling the electric drive mechanism in accordance with the second detection signal sent from the second detecting device.

3. The image recording apparatus as defined in claim 1, wherein the fixing device is worn on a head of the cameraman such that the imaging portion is placed substantially at a height of an eye of the cameraman.

4. The image recording apparatus as defined in claim 3, further comprising:
   an image display apparatus, the image display apparatus being arranged over the eye of the cameraman when the fixing device is worn on the head of the cameraman, the image display apparatus including
   an image display for displaying an image represented by the image signal sent from the imaging portion; and
   an optical system for forming an optical path to transmit a light from the image display to the eye of the cameraman so as to enable the cameraman to look at the image displayed on the image display.

5. The image recording apparatus as defined in claim 3, further comprising:
   an image display apparatus, the image display apparatus being arranged over the eye of the cameraman when the fixing device is worn on the head of the cameraman, the image display apparatus including
   a first optical system for forming a first optical path to transmit a light from the subject to the eye of the cameraman so as to enable the cameraman to look at the subject directly;
   an image display for displaying an image represented by the image signal sent from the imaging portion, the image display being arranged outside the first optical path; and
   a second optical system for forming a second optical path to transmit a light from the image display to the eye of the cameraman so as to enable the cameraman to look at the image displayed on the image display.

6. The image recording apparatus as defined in claim 1, wherein the image display apparatus further comprises:
   an optical path selecting device for selecting one of the first optical system and the second optical system to be activated; and
   an optical path switching device for selectively activating the selected one of the first optical system and the second optical system.

7. The image recording apparatus as defined in claim 1, wherein the image display apparatus further comprises a semitransparent mirror provided on the first optical path so as to enable the cameraman to look at the subject directly and look at the image displayed on the image display at the same time.

8. The image recording apparatus as defined in claim 7 wherein the image display apparatus further comprises a light quantity adjusting device for adjusting quantity of light transmitted through the first optical path, the light quantity adjusting device being arranged on a subject's side of the semitransparent mirror on the first optical path.

9. The image recording apparatus as defined in claim 6 said optical path switching device including a movable mirror.

10. An image recording apparatus, comprising:
    an imaging portion provided with a taking lens and an imaging device, the imaging device photoelectrically converting an image of a subject formed through the taking lens into an image signal;
    a detecting device for generating a detection signal upon detecting one of a voice of a cameraman and a movement of a predetermined portion other than hands of a body of the cameraman, wherein said detecting device detects a muscle movement of the predetermined part other than hands of the body of the cameraman, and wherein said muscle movement is a movement of a temple of the cameraman or a blinking action of an eye of the cameraman;

a fixing device for fixing the imaging portion and the detecting device to the body of the cameraman such that the taking lens is directed in the same direction that a face of the cameraman faces, the fixing device being worn on a head of the cameraman such that the imaging portion is placed substantially at a height of an eye of the cameraman;

a body for recording the image signal in a recording portion in accordance with the detection signal sent from the detecting device; and an image display apparatus, the image display apparatus being arranged over the eye of the cameraman when the fixing device is worn on the head of the cameraman, the image display apparatus including
- a first optical system for forming a first optical path to transmit a light from the subject to the eye of the cameraman so as to enable the cameraman to look at a subject directly,
- an image display for displaying an image represented by the image signal sent from the imaging portion, the image display being arranged outside the first optical path, and
- a second optical system for forming a second optical path to transmit a light from the image display to the eye of the cameraman so as to enable the cameraman to look at the image displayed on the image display.

11. An image recording apparatus comprising:

an imaging portion provided with a taking lens and an imaging device, the imaging device photoelectrically converting an image of a subject formed through the taking lens into an image signal;

a detecting device for generating a detection signal upon detecting a movement of a predetermined part other than hands of a body of a cameraman, wherein said detecting device detects a muscle movement of the predetermined part other than hands of the body of the cameraman, and wherein said muscle movement is a movement of a temple of the cameraman or a blinking action of an eye of the cameraman;

a fixing device for detachably fixing the imaging portion and the detecting device to the body of the cameraman such that the taking lens is directed in the same direction that a face of the cameraman faces; and a body for recording the image signal in a recording portion in accordance with the detection signal sent from the detecting device.

* * * * *